United States Patent [19]

Matsuhisa

[11] 4,299,638
[45] Nov. 10, 1981

[54] METHOD OF BONDING SILICON CERAMIC MEMBERS

[75] Inventor: Tadaaki Matsuhisa, Nagoya, Japan

[73] Assignee: NGK Insulators, Ltd., Nagoya, Japan

[21] Appl. No.: 122,679

[22] Filed: Feb. 19, 1980

[30] Foreign Application Priority Data

Feb. 28, 1979 [JP] Japan ................................. 54-21833

[51] Int. Cl.³ ....................... B32B 31/26; C04B 39/00
[52] U.S. Cl. ........................................ 156/85; 156/86; 156/89; 156/293; 156/294; 501/154
[58] Field of Search ...................... 156/85, 86, 89, 293, 156/294; 264/230, 342 R; 106/39.5, 73.5

[56] References Cited

U.S. PATENT DOCUMENTS

| | | | |
|---|---|---|---|
| 1,164,739 | 12/1915 | Mershow | 156/89 |
| 3,564,328 | 2/1971 | Bagley et al. | 156/89 |
| 4,156,051 | 5/1979 | Nakamura et al. | 106/73.5 |

FOREIGN PATENT DOCUMENTS 2707835 9/1977 Fed. Rep. of Germany ........ 156/89

*Primary Examiner*—Caleb Weston
*Attorney, Agent, or Firm*—Stevens, Davis, Miller & Mosher

[57] ABSTRACT

Silicon ceramic articles having a complicated shape and a high strength can be obtained in a high dimensional accuracy by fitting a silicon ceramic member having a lower firing shrinkage into another silicon ceramic member having a higher firing shrinkage, and firing the resulting assembly to bond firmly both the members into one integral body. The silicon ceramic article can be used as gas turbine parts, engine parts and the like.

1 Claim, 3 Drawing Figures

METHOD OF BONDING SILICON CERAMIC MEMBERS

BACKGROUND OF THE INVENTION (1) Field of the Invention

The present invention relates to a method of bonding firmly silicon ceramic members with each other.

(2) Description of the Prior Art

Silicon ceramics, such as silicon nitride, silicon carbide and the like, have excellent mechanical strength, heat resistance, thermal shock resistance and corrosion resistance, and are expected to be used as high-temperature materials, such as gas turbine parts, engine parts and the like. In general, ceramics are inferior in moldability and workability to metal material which is used as a material for gas turbine parts, engine parts and the like. Among ceramics, silicon ceramics are difficult to be molded and worked, because it is difficult to select proper additives for molding and working silicon ceramics without decreasing their inherent excellent properties. While, gas turbine parts, such as a rotor, nozzle and the like, and engine parts, such as a combustion chamber, cylinder and the like, have a three-dimensionally curved structure and a complicated shape. In order to produce those engine parts from silicon ceramics having poor moldability and workability, there is generally carried out a method, wherein previously molded and worked separate members are fitted to each other or bonded with each other, and the resulting assembly is formed into one integral body.

For example, as the method of producing a silicon ceramic rotor by bonding a silicon ceramic blade with a silicon ceramic disc, there have hitherto been known a method, wherein a reaction-sintered silicon nitride blade and a silicon nitride disc produced by a hot press method are formed into one integral body by a hot press method through silicon nitride powder interposed therebetween; and a method, wherein a reaction-sintered silicon nitride formed by a slip cast method is interposed between a reaction-sintered silicon nitride blade and a silicon nitride disc produced by a hot press method, the resulting assembly is nitrided, and then the blade and disc are bonded with each other so as to form one integral body by a hot press method.

However, these methods have the following drawbacks. Because, in these methods, both the silicon nitride members to be bonded must be formed into one integral body by a hot press method, and therefore a complicated apparatus is required, mass production of aimed product is difficult, bonded members deform easily, the product is poor in the dimensional accuracy, and the bonding layer of both the members has often insufficiently bonded portion, from which the products are apt to be broken during the test.

SUMMARY OF THE INVENTION

The present invention has solved the above described drawbacks of conventional methods, and provides a method of bonding silicon ceramic members with each other in a high bonding strength in a very simple manner.

That is, the feature of the present invention is the provision of a method of bonding at least two silicon ceramic members with each other, comprising fitting a first silicon ceramic member into a second silicon ceramic member to form an assembly, the first silicon ceramic member having a firing shrinkage lower than that of a second silicon ceramic member, and firing the assembly so as to bond firmly the first and second silicon ceramic members into one integral body.

DETAILED DESCRIPTION OF THE PREFERRED EMBODIMENT

In the method of bonding ceramic members according to the present invention, a first silicon ceramic member having a firing shrinkage lower than that of a second silicon ceramic member is held in the second silicon ceramic member, and the dimensions of both the first and second silicon ceramic members are previously determined such that both the members are shrunk during the firing to bond firmly with each other at the bonding interface.

In the production of silicon ceramic articles, for example, in the production of pressureless sintered silicon nitride articles, when the second silicon ceramic member has a firing shrinkage higher than that of the first silicon ceramic member, which is held in the seccond member, any of the following combinations of second member-first member may be used. That is, green ceramics-green ceramics, green ceramics-calcined ceramics, calcined ceramics-calcined ceramics, calcined ceramics-fired ceramics, and fired ceramics-fired ceramics.

The present invention can be further applied to a combination of a first ceramic member of a reaction-sintered silicon nitride having a very low firing shrinkage with a second ceramic member of a pressureless sintered silicon nitride having a high firing shrinkage.

Furthermore, in the present invention, when the first silicon ceramic member is fitted into the second silicon ceramic member through a layer of powder, paste or slurry of metallic silicon, silicon nitride or silicon carbide interposed between both the members at the interface, and the resulting assembly is fired under a non-oxidizing atmosphere, such as nitrogen gas or the like, the bonding strength of both the members at the bonding interface can be more improved.

The following examples are given for the purpose of illustrating this invention and are not intended as limitations thereof.

EXAMPLE 1

Figure 1:
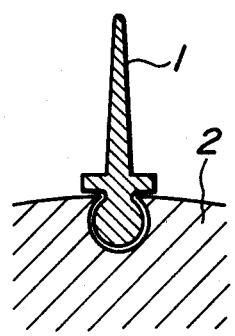
FIG. 1 is a cross-sectional view of a bonding portion, before firing, of ceramic members to be bonded with each other according to the present invention.

Silicon nitride powder having a purity of 99% and consisting mainly of α-phase silicon nitride was pulverized in wet state by means of a porcelain ball mill and then dried. To 500 g of the dried silicon nitride powder were added 10 g of MgO and 10 g of BeO as a sintering aid, 5 g of ammonium alginate as a deflocculant and 100 g of water to prepare a slip. The slip was cast into a mold made of gypsum and designed for molding a turbine blade 1 shown in FIG. 1 and molded therein. The molded article, after released from the mold, was completely dried and then calcined at 1,500° C. for 30 minutes under nitrogen atmosphere to obtain the turbine blade 1 shown in FIG. 1. While, 1,000 g of the same pulverized silicon nitride powder as described above was homogeneously mixed with 20 g of MgO and 20 g of BeO as a sintering aid, 10 g in dry basis of vinyl acetate as a binder and 50 g of water. The resulting mixture was press molded under a static pressure of 1,000 kg/cm$^2$ in a mold designed for molding a turbine disc 2 shown in FIG. 1. After fully drying, the molded article was drilled and then calcined at 1,200° C. for 60 minutes under nitrogen atmosphere to obtain the turbine disc 2 shown in FIG. 1.

Figure 2:
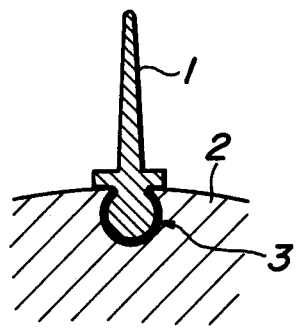
FIG. 2 is a cross-sectional view of the same portion as that shown in FIG. 1 after firing, and shows the bonded state of the ceramic members.

The blade 1 was fitted into the disc 2, and the resulting assembly was fired at 1,650° C. for 30 minutes under nitrogen atmosphere to obtain a rotor having an integral structure shown in FIG. 2. In the above described firing at 1,650° C. for 30 minutes, the firing shrinkage of the blade was 5% and that of the disc was 12%, and the blade and disc were completely formed into one integral body at the bonding interface 3 by sintering as shown in FIG. 2.

EXAMPLE 2

To 1,000 g of the same pulverized silicon nitride powder as used in Example 1 were added 20 g of MgO and 10 g of BeO as a sintering aid, 5 g of methylcellulose as a binder and 100 g of water, and the resulting mixture was homogeneously mixed. The homogeneous mixture was filled in a rubber mold, which was designed for molding an outer cylinder 6 shown in FIG. 3, had an inner diameter of 140 mm and was provided therein with an iron core having an outer diameter of 88 mm, and press molded isostatically therein under a pressure of 2,000 kg/cm$^2$ to obtain the outer cylinder 6 shown in FIG. 3. While, 1,000 g of metallic silicon powder was homogeneously mixed with 20 g in dry basis of vinyl acetate as a binder. The homogeneous mixture was filled in a rubber mold, which was designed for molding an inner cylinder 4 shown in FIG. 3, had an inner diameter of 90 mm and was provided therein with an iron core having an outer diameter of 60 mm, and press molded isostatically therein under a pressure of 1,500 kg/cm$^2$. After drying, the press molded inner cylinder was ground by means of a lathe to make its outer diameter into 76 mm, and then fully nitrided at a maximum temperature of 1,450° C. for 60 hours in a furnace kept under nitrogen atmosphere. There was no change in the outer diameter of the inner cylinder during the nitriding.

Figure 3:
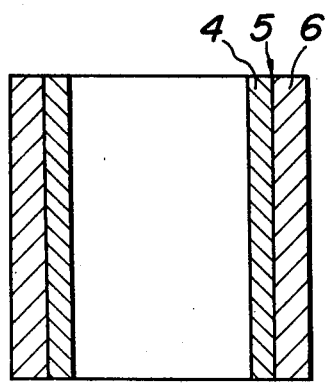
FIG. 3 is a cross-sectional view illustrating bonding of cylindrical ceramic members into one integral body according to the present invention.

The prese molded outer cylinder 6 was subjected to a predetermined working, and then the nitrided inner cylinder 4 was fitted into the outer cylinder 6, and the resulting assembly was fired at 1,700° C. for 30 minutes under nitrogen atmosphere to obtain a cylinder having an integral structure shown in FIG. 3.

In the above described firing at 1,700° C. for 30 minutes, the firing shrinkage of the inner cylinder was 1% and that of the outer cylinder was 15%, and the inner and outer cylinders were formed into one integral body at the bonding interface 5 by sintering as shown in FIG. 3.

As described above, according to the method of bonding ceramic members of the present invention, silicon ceramic articles having a complicated shape and a high strength can be obtained inexpensively and very easily in a high dimensional accuracy. Therefore, the present invention can be applied to the production of ceramic gas turbine parts, such as ceramic rotor and nozzle and the like, and ceramic engine parts, such as ceramic cylinder and combustion chamber and the like, and the present invention is very useful in industry.

What is claimed is:

1. A method of bonding at least two silicon ceramic members with each other, comprising fitting a first silicon ceramic member into a second silicon ceramic member through a layer of powder, paste or slurry of metallic silicon, silicon nitride or silicon carbide interposed between both the members at the interface to form an assembly, the first silicon ceramic member having a firing shrinkage lower than that of the second silicon ceramic member, and firing the assembly so as to bond firmly the first and second silicon ceramic members into one integral body.

* * * * *